United States Patent
Marui et al.

(10) Patent No.: US 11,010,225 B2
(45) Date of Patent: May 18, 2021

(54) ELECTRONIC CONTROL UNIT INCLUDING A BREAK-OUTPUT SECTION CONFIGURED TO OUTPUT A BREAK SIGNAL TO INTERRUPT AN INPUT OF A MONITORING SIGNAL TO AN EXTERNAL MONITORING CIRCUIT

(71) Applicant: DENSO CORPORATION, Kariya (JP)

(72) Inventors: Daichi Marui, Kariya (JP); Mitsuru Aoki, Kariya (JP)

(73) Assignee: DENSO CORPORATION, Kariya (JP)

( * ) Notice: Subject to any disclaimer, the term of this patent is extended or adjusted under 35 U.S.C. 154(b) by 213 days.

(21) Appl. No.: 16/288,523

(22) Filed: Feb. 28, 2019

(65) Prior Publication Data

US 2019/0294488 A1 Sep. 26, 2019

(30) Foreign Application Priority Data

Mar. 22, 2018 (JP) .............................. JP2018-55001

(51) Int. Cl.
| | |
|---|---|
| G06F 11/00 | (2006.01) |
| G06F 11/07 | (2006.01) |
| F02D 41/26 | (2006.01) |
| F02D 11/10 | (2006.01) |
| H01H 47/00 | (2006.01) |
| G06F 11/30 | (2006.01) |
| G06F 11/22 | (2006.01) |

(52) U.S. Cl.
CPC ........ *G06F 11/0757* (2013.01); *F02D 11/107* (2013.01); *F02D 41/266* (2013.01); *G06F 11/0736* (2013.01); *G06F 11/2215* (2013.01); *G06F 11/30* (2013.01); *H01H 47/002* (2013.01)

(58) Field of Classification Search
CPC ............. G06F 11/0736; G06F 11/0757; G06F 11/079; G06F 11/2215
See application file for complete search history.

(56) References Cited

U.S. PATENT DOCUMENTS

| | | | | |
|---|---|---|---|---|
| 6,168,321 | B1 * | 1/2001 | Tanaka ................ | G06F 11/1433 365/230.03 |
| 7,809,481 | B2 * | 10/2010 | Okada ................ | G05B 23/0264 701/31.4 |
| 8,954,219 | B2 * | 2/2015 | Kobayashi ........... | G07C 5/0808 701/29.2 |
| 9,298,530 | B2 * | 3/2016 | Fuchigami ............ | G06F 11/079 |

(Continued)

FOREIGN PATENT DOCUMENTS

JP 2016-203764 A 12/2016

*Primary Examiner* — Elmira Mehrmanesh
(74) *Attorney, Agent, or Firm* — Posz Law Group, PLC (57) ABSTRACT

An electronic control unit includes a computer that outputs a monitoring signal and an external monitoring circuit that monitors a state of the computer based on the monitoring signal. The computer includes a monitoring signal output section that generates and outputs the monitoring signal to the external monitoring circuit by performing a software process; a self-diagnostic section that self-diagnoses the computer and detects an abnormality by identifying a cause of the abnormality; and a break signal output section that outputs a break signal to interrupt an input of the monitoring signal to the external monitoring circuit by performing a hardware process when an abnormality in the monitoring signal output section is detected.

3 Claims, 5 Drawing Sheets

(56) References Cited

U.S. PATENT DOCUMENTS

| | | | |
|---|---|---|---|
| 9,477,542 B2* | 10/2016 | Aoki | G06F 11/0739 |
| 9,742,324 B2* | 8/2017 | Fukuta | H02P 29/032 |
| 10,378,473 B2* | 8/2019 | Ozaki | F02D 41/22 |
| 10,585,755 B2* | 3/2020 | Yamamoto | G06F 11/0757 |
| 2006/0293831 A1 | 12/2006 | Yano | |
| 2008/0229151 A1 | 9/2008 | Ito | |
| 2016/0347326 A1* | 12/2016 | Iwagami | B60W 50/023 |
| 2017/0249224 A1* | 8/2017 | Suzuki | G06F 11/2215 |
| 2019/0354424 A1* | 11/2019 | Ishigooka | G06F 11/0772 |

* cited by examiner

ELECTRONIC CONTROL UNIT INCLUDING A BREAK-OUTPUT SECTION CONFIGURED TO OUTPUT A BREAK SIGNAL TO INTERRUPT AN INPUT OF A MONITORING SIGNAL TO AN EXTERNAL MONITORING CIRCUIT

CROSS REFERENCE TO RELATED APPLICATION

The present application is based on and claims the benefit of priority of Japanese Patent Application No. 2018-055001, filed on Mar. 22, 2018, the disclosure of which is incorporated herein by reference.

TECHNICAL FIELD

The present disclosure relates to an electronic control unit (ECU).

BACKGROUND INFORMATION

Electronic control units may include computers that output a watchdog (WD) signal and integrated circuits (ICs) that monitor the state of the computers for abnormalities based on the watchdog signal. Abnormalities may occur in the computers that cannot be detected by the ICs monitoring the watch dog signal. As such, electronic control units with such computers and monitoring ICs are subject to improvement.

SUMMARY

The present disclosure describes an electronic control unit capable of detecting an abnormality of a computer by using an external monitoring circuit, even when an abnormality occurs in a monitor-output section of the computer that outputs a monitoring signal.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Electronic control units may include computers that output a watchdog (WD) signal and integrated circuits (ICs) that monitor the state of the computers for abnormalities based on the watchdog signal.

The computer may have, more specifically, a watchdog (WD) output section that outputs the watchdog signal by software processing. That is, the computer may have a monitor-output section that outputs a monitoring signal. When an abnormality occurs in a part/component of the computer used for generating and outputting the watchdog signal, e.g., in a memory such as a ROM or RAM serving as a storage section, and/or in a CPU serving as an arithmetic processor, the watchdog signal may not indicate the abnormality occurring in the memory or CPU of the monitor-output section and the watchdog signal may continue to be output from the monitor-output section. As such, the monitoring IC (e.g., an external monitoring circuit) may not be able to detect the abnormality in the monitor-output section, even though the abnormality exists in the computer.

The embodiments are described with reference to the drawings. In the embodiments, like parts and features among the embodiments may be described. That is, like parts and features described with reference to previous embodiments may be used in the description of latter embodiments as indicated by the use of the same reference characters in the drawings and the description. A repeat description of the like parts and features already described in a previous embodiment may be omitted from the description of the latter embodiments.

First Embodiment

Figure 1:
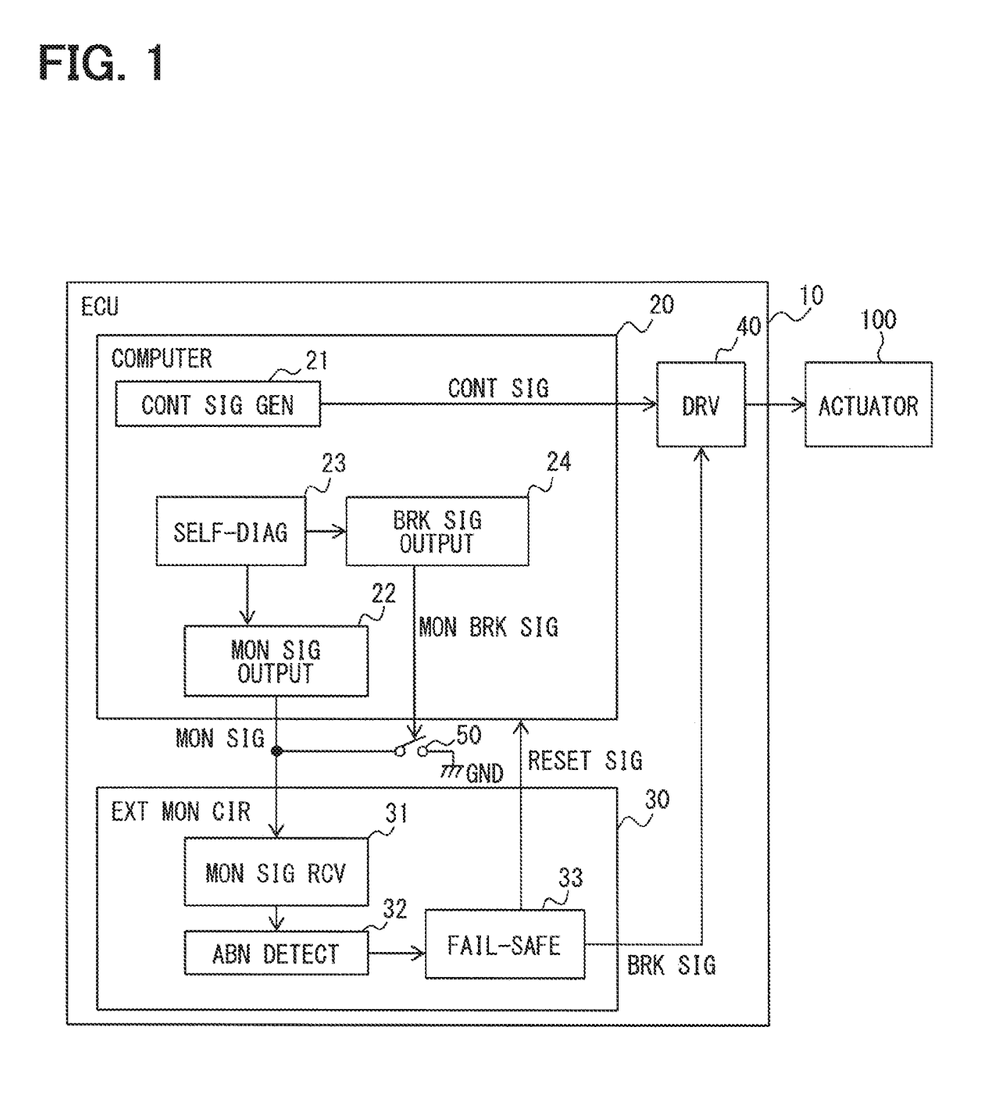
FIG. 1 is a block diagram of an electronic control unit in a first embodiment of the present disclosure.

FIG. 1 illustrates a schematic configuration of an electronic control unit (ECU) according to the present embodiment.

An ECU 10 shown in FIG. 1 is configured as an engine ECU that controls an engine (not shown). The engine may be an internal combustion engine in a vehicle such as an automobile. The electronic control unit 10 includes a computer 20, an external monitoring circuit 30, a drive unit 40, and a break switch 50. The external monitoring circuit 30 is described as "external," because the external monitoring circuit 30 is separate from, and external to, the computer 20.

The computer 20 may be a smaller sized computer such as a microcontroller or a system on a chip (SoC) and may include one or more CPUs (processor cores); semiconductor memory such as ROM, RAM, flash, and like storage; communication circuitry for communicating with other devices; and input/output (I/O) circuitry/peripherals for performing I/O operations (all not shown). The CPU of the computer 20 may use information acquired from various sensors to perform a predetermined process such as a computational or arithmetic process based on a program/instruction set stored in the ROM while using the RAM as temporary storage. That is, the computer 20 includes the ROM as a first memory for storing a program, the CPU as a computing/arithmetic processing section for executing an arithmetic operation based on the program/instruction set, and the RAM as a second memory for storing data from the computational/arithmetic operation.

The computer 20 may execute the predetermined process to control a control object. In the present embodiment, examples of control objects controlled by the computer 20 include a fuel injector, a spark plug, and an electronic throttle motor. In FIG. 1, an electronic throttle motor is shown as an actuator 100. The computer 20 includes a control signal generator 21, a monitoring signal output section 22, a self-diagnostic section 23, and a break signal output section 24. The control signal generator 21, the monitoring signal output section 22, the self-diagnostic section 23, and the break signal output section 24 of the computer 20 may be considered as functional blocks of the computer 20. The functional blocks may be functions/processes performed by the computer 20, where one or more processes may be associated with each of the blocks. In other words, the computer 20 is configured to perform the processes associated with the control signal generator 21, the monitoring signal output section 22, the self-diagnostic section 23, and the break signal output section 24, for example, by using the CPU to execute a program/instruction set stored in memory along with the I/O and other circuitry of the computer, that is, as a combination of software and hardware. The control signal generator 21, the monitoring signal output section 22, the self-diagnostic section 23, and the break signal output section 24 may also be realized as hardware and specialized circuitry configured to perform the processes associated with each element. For example, each of the control signal generator 21, the monitoring signal output section 22, the self-diagnostic section 23, and the break signal output section 24 may include analog circuit elements, digital circuit elements, logical circuit elements, or a combination of circuit elements to perform the specific processes associated with each element. Each of the control signal generator 21, the monitoring signal output section 22, the self-diagnostic section 23, and the break signal output section 24 may also be configured as specialized circuits, such as an application-specific integrated circuit (ASIC) or a field-programmable gate array (FPGA), for performing the specific processes associated with each element. The processes associated with each of the control signal generator 21, the monitoring signal output section 22, the self-diagnostic section 23, and the break signal output section 24 are described below in greater detail.

The control signal generator 21 acquires output signals from an accelerator opening sensor, a throttle opening sensor, a crank angle sensor, as well as other sensors, and calculates a control amount for the actuator 100 based on the acquired signals. The control signal generator 21 then outputs the calculation result to the drive unit 40 as a control signal.

The monitoring signal output section 22 generates a monitoring signal by software processing, and outputs the monitoring signal to the external monitoring circuit 30. The monitoring signal output section 22 may be referred to more simply as the monitoring signal output section 22. In the present embodiment, the monitoring signal output section 22 generates and outputs a watchdog signal (WDC) as the monitoring signal. The watchdog signal WDC is a signal for clearing a watchdog timer in the external monitoring circuit 30. As such, the watchdog signal WDC may also be referred to as a watchdog clear signal WDC.

When there are no abnormalities (e.g., errors, malfunctions) occurring in the computer 20, the monitoring signal output section 22 periodically outputs a watchdog signal WDC. However, when the self-diagnostic section 23 detects an abnormality in the computer 20, the monitoring signal output section 22 stops outputting the watchdog signal WDC. Stopping the output of the watchdog signal WDC notifies the external monitoring circuit 30 that there is an abnormality in the computer 20. In other words, when the external monitoring circuit 30 stops receiving the periodic watchdog signal WDC, the monitoring circuit 30 determines there is an abnormality in the computer 20. As such, the monitoring signal output section 22 generates a monitoring signal based on the abnormality detection result by the self-diagnostic section 23.

The self-diagnostic section 23 performs a self-diagnostic of, or self-diagnosis on, the computer 20 to detect any abnormalities in the computer 20. In such manner, the computer 20 has a self-diagnostic function. The self-diagnostic section 23 can detect and identify the cause of abnormalities in the computer 20. The self-diagnostic section 23 may be referred to more simply as a diagnostic section 23 or an abnormality detector 23. Example diagnostics performed by the self-diagnostic section 23 may include detecting an abnormality in the CPU that performs the calculation/arithmetic operation, detecting an abnormality in the ROM where programs/instruction sets are stored, and detecting an abnormality in the RAM that stores the data. The self-diagnostic section 23 can detect an abnormality in the memory (e.g., ROM and RAM) and identify the area in the memory (i.e., the memory address) where the abnormality occurs. In such manner, it is possible for the self-diagnostic section 23 to identify the cause of the abnormality from the identified abnormal area in the memory.

The break signal output section 24 generates and outputs a break signal to stop (i.e., interrupt) the watchdog signal WDC from being input to the external monitoring circuit 30 by using hardware (i.e., as a hardware process). The break signal output section 24 may be referred to more simply as a break-output section 24. In the description, the break signal output from the break-output section 24 may be designated as a monitor break signal to distinguish this break signal from other break signals in the description (e.g., the break signal output from fail-safe assurer 33).

When an abnormality related to the monitoring signal output section 22 (e.g., a software abnormality) is detected by the self-diagnostic section 23, the break signal output section 24 generates and outputs a monitor break signal. Conversely, when an abnormality not related to the monitoring signal output section 22 is detected, the monitor break signal is not output. The monitor break signal is also not output when no abnormalities are detected in the computer 20. The monitoring signal output section 22 may output, for example, a high level signal (H level signal) as the monitor break signal. In other words, the monitoring signal output section 22 outputting an H level signal may indicate a monitor break signal.

The external monitoring circuit 30 monitors the state of the computer 20 based on the monitoring signal. The external monitoring circuit 30 may be an integrated circuit (IC) or a computer different from the computer 20. As described above, the external monitoring circuit 30 is another computer separate from, and "external" to, the computer 20. For example, the external monitoring circuit 30 may be realized, for example, as a microcontroller or a system on a chip (SoC). In the present embodiment, an IC is adopted as the external monitoring circuit 30. That is, the external monitoring circuit 30 may be an SoC integrated circuit that integrates the components of a computer or like electronic system. The external monitoring circuit 30 may include one or more central processing units (CPUs or processor cores); memory such as RAM, ROM, and flash memory; input/output (I/O) ports; communication circuitry; and secondary storage within an integrated circuit package. The external monitoring circuit 30 and the computer 20 are configured to communicate bidirectionally. That is, the external monitoring circuit 30 and the computer 20 may reciprocally communicate back and forth with one another.

The external monitoring circuit 30 has a monitoring signal receiving section 31, an abnormality detector 32, and the fail-safe assurer 33. The monitoring signal receiving section 31 receives the monitoring signal output from the monitoring signal output section 22. Each of the monitoring signal receiving section 31, the abnormality detector 32, and the fail-safe assurer 33 elements may be considered as functional block elements of the external monitoring circuit 30 IC, or as specific circuits elements within the external monitoring circuit 30 IC that may be realized as a combination of analog, digital, and/or logical hardware components and configured to perform the processes described below that are associated with each of the elements.

The abnormality detector 32 detects an abnormality of the computer 20 based on the monitoring signal that is received by the monitoring signal receiving section 31. In the present embodiment, the abnormality detector 32 has a watchdog timer (not shown). The watchdog timer (i.e., counter) measures the duration of events (e.g., the duration of abnormality detection) as a count value. The watchdog timer may also count the occurrence of events (e.g., the number of times an abnormality occurs) as a count value. The count value of the abnormality detector 32 may be compared against one or more threshold values to determine whether there are abnormalities in the computer 20. When the computer 20 operates normally (e.g., without abnormalities), the monitoring signal output section 22 outputs the monitoring signal periodically and the abnormality detector 32 clears the count of the watchdog timer before the count reaches the threshold value. When the computer 20 has an abnormality, i.e., when the computer 20 is in an abnormal state, the output of the monitoring signal is stopped, and consequently, the count of the watchdog timer increases to be equal to or greater than the threshold value. When the count is equal to or greater than the threshold value, the abnormality detector 32 detects (i.e., determines) that the computer 20 is in an abnormal state and not functioning normally.

When the abnormality detector 32 detects an abnormality in the computer 20, the fail-safe assurer 33 performs a fail-safe process. In the present embodiment, when the abnormality detector continuously detects an abnormality over a predetermined period of time, the fail-safe assurer 33 performs the fail-safe process. The fail-safe assurer 33 outputs a reset signal to the computer 20 and a break signal to the drive unit 40 as the fail-safe process. Upon receiving the reset signal, the computer 20 performs a reset.

The drive unit 40 drives the actuator 100 based on the control signal. In the present embodiment, the drive unit 40 controls an H bridge circuit for driving the electronic throttle motor (i.e., the actuator 100). The H bridge circuit includes a plurality of switching elements and can be controlled to switch the polarity of the voltage applied to the actuator 100. In the H bridge circuit, each switching element can be controlled by the control signal to be turned ON and OFF. When the drive unit 40 receives the break signal from the fail-safe assurer 33 (i.e., the drive unit 40 inputs the break signal), the drive unit 40 stops driving the actuator 100.

The break switch 50 is turned ON by the monitor break signal. More specifically, the break switch 50 is turned ON when the break switch 50 receives the H level monitor break signal as a monitor break signal (i.e., when the H level monitor break signal is input). The break switch 50 is turned OFF during other periods when a low or L level signal is input. The break switch 50 is disposed at a position between the computer 20 and the external monitoring circuit 30. The break switch is disposed more specifically at a position between a communication line and the ground (GND), where the communication line is used to transmit a monitoring signal from the computer 20 to the external monitoring circuit 30. When the break switch 50 is turned ON, the communication line is connected to the ground, and the monitoring signal is kept at the ground potential. When the monitor break signal is output and the break switch 50 is turned ON, even when the monitoring signal output section 22 outputs the monitoring signal, a monitor-stop state equivalent is realized. That is, the computer 20 is considered to be in, or is treated as having a monitor-stop equivalent state where the output of the monitoring signal is stopped. In this case, even though the monitoring signal is being output, the monitoring signal appears as if it is not being output. A semiconductor switch such as a MOSFET can be used, for example, as the break switch 50.

While the monitoring signal output section 22 generates and outputs a monitoring (WD) signal as a software process, the monitor-stop state equivalent can be realized using hardware (i.e., as a hardware process or hardware processing) that includes a hardware switching element 50 connected to ground to control the potential (i.e., signal level) of the monitoring signal being output from the monitoring signal output section 22. In other words, the break-output section is configured to output the monitor break signal to the external monitoring circuit 30 via (i.e., by using) a switch 50 as a hardware element, so that output of the monitor break signal can be realized as a hardware process.

An abnormality detection process (i.e., abnormality-handling) performed by the electronic control unit 10 is described with reference to FIGS. 2 to 4. When the power supply to the electronic control unit 10 is turned ON, the electronic control unit 10 performs the processes described in the following paragraphs. The following abnormality detection processes may be performed by the computer 20 and its associated circuit elements (e.g., 21, 22, 23, and 24) and the external monitoring circuit 30 and its associated circuit elements (e.g., 31, 32, and 33).

Figure 2:
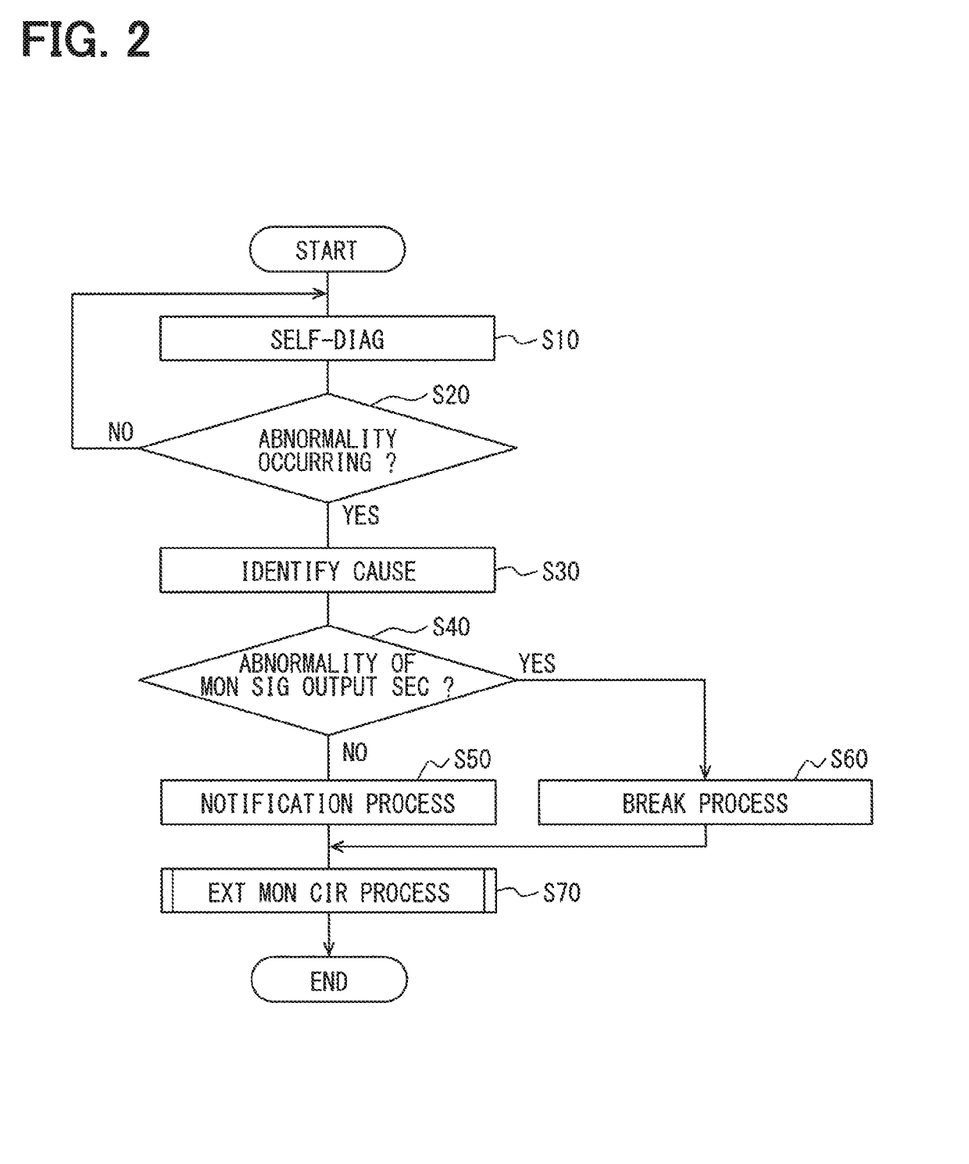
FIG. 2 is a flowchart of an abnormality detection process performed by the electronic control unit.

With reference to FIG. 2, at S10, the self-diagnostic section 23 of the computer 20 first performs a self-diagnostic of the computer 20. At S20, the self-diagnostic section 23 determines whether any abnormalities are present or have occurred. When the self-diagnostic section 23 determines that an abnormality has occurred, that is, when an abnormality is detected, i.e., "YES" at S20, the process proceeds to S30. At S30, the self-diagnostic section 23 identifies the cause of the abnormality. When the self-diagnostic section 23 determines that no abnormality has occurred, that is, when no abnormality is detected, i.e., "NO" at S20, the process returns to S10, and the self-diagnostic section performs the self-diagnostic of the computer 20 again.

After the self-diagnostic section 23 identifies the cause of the abnormality at S30, the process proceeds to S40. At S40, the self-diagnostic section 23 determines whether the detected abnormality is related to the monitoring signal output section 22 and outputs a determination result to the monitoring signal output section 22 and the break signal output section 24. In the present embodiment, the self-diagnostic section 23 outputs a signal indicating whether an abnormality is detected to the monitoring signal output section 22. Upon detecting an abnormality related to the monitoring signal output section 22, the self-diagnostic section 23 instructs the break signal output section 24 to output a monitor break signal.

Figure 3:
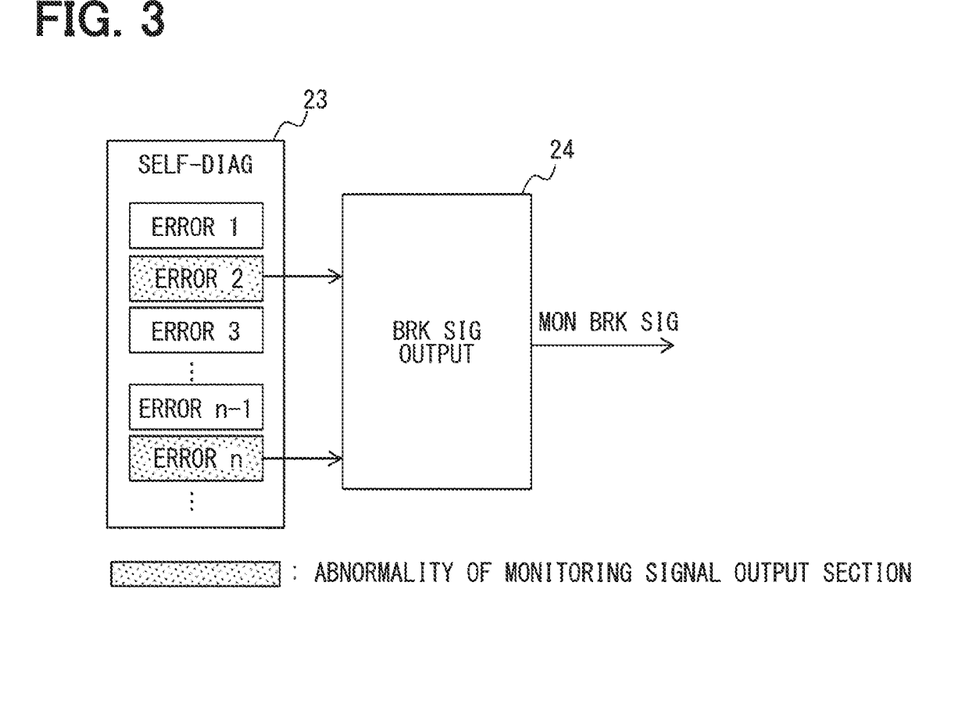
FIG. 3 illustrates how a monitor break signal is output.

As shown in FIG. 3, the self-diagnostic section 23 self-diagnoses the computer 20 to detect abnormalities (e.g., errors) in the computer 20. As described above, the self-diagnostic section 23 can identify the cause of the abnormality. The self-diagnostic section 23 can identify an abnormality related to the monitoring signal output section 22 from an address of the ROM and/or the RAM. FIG. 3 shows errors (i.e., error 1 to error n) detected by the self-diagnostic section 23 as abnormalities. From among these errors, the error 2 and the error n are abnormalities related to the monitoring signal output section 22. As such, upon detecting the error 2 and the error n, the self-diagnostic section 23 instructs the break signal output section 24 to output the monitor break signal. A dotted pattern is applied to the error 2 and the error n in FIG. 3 to distinguish these abnormalities related to the monitoring signal output section 22 from the other abnormalities (e.g., error 1, error 3, error n−1).

Returning to FIG. 2, when the self-diagnostic section 23 determines that the abnormality is not related to the monitoring signal output section 22, i.e., "NO" at S40, the process proceeds to S50. At S50, the monitoring signal output section 22 performs a notification process to notify the external monitoring circuit 30 that there is an abnormality in the computer 20 other than an abnormality of the monitoring signal output section 22. In the present embodiment, the monitoring signal output section 22 stops the output of the monitoring signal to provide notification of the abnormality. Since the detected abnormality is not an abnormality related to the monitoring signal output section 22, the monitoring signal output section 22 can operate normally.

On the other hand, when the self-diagnostic section 23 determines that the abnormality is related to the monitoring signal output section 22, i.e., "YES" at S40, the process proceeds to S60. At S60, the break signal output section 24 performs a break process. In the present embodiment, the break signal output section 24 outputs an H level signal as a monitor break signal to turn ON the break switch 50. As a result, the monitoring signal output from the monitoring signal output section 22 is kept at the ground potential to realize a monitor-stop equivalent state (i.e., equivalent to stopping the output of the monitoring signal). The processes at S10, S20, S30, S40, S50, and S60 are performed by the computer 20.

After performing the processes at S50 or S60, the process proceeds to S70. At S70, the external monitoring circuit 30 then performs a subprocess of the abnormality detection process shown as "EXT MON CIR PROCESS" in FIG. 2 and described in greater detail with reference to FIG. 4. After the external monitoring circuit 30 performs the subprocess at S70 (i.e., as shown in FIG. 4), the series of processes end. When the series of processes are completed, the electronic control unit 10 performs the above-described abnormality detection process again during a period when the power supply is turned ON.

The processing at S70 performed by the external monitoring circuit 30 of the present embodiment, i.e., "An external monitoring circuit process," is described with reference to FIG. 4. As shown in FIG. 4, at S71, the abnormality detector 32 of the external monitoring circuit 30 determines whether an abnormality of the computer 20 has been detected. In the present embodiment, when the count of the watchdog timer is equal to or greater than the threshold value, the abnormality detector 32 detects (i.e., determines) that the computer 20 has an abnormality.

When the abnormality detector 32 detects an abnormality, i.e., "YES" at S71, the process proceeds to S72. At S72, the abnormality detector 32 determines whether the detection of the abnormality continues for a predetermined (i.e., preset) period. For example, when a value of a counter that measures the number of times the abnormality is detected exceeds a preset number, the abnormality detector 32 may determine that the abnormality has continued over the duration of the preset period. Alternatively, the abnormality detector 32 may measure the length of the abnormality detection to determine whether the abnormality has continued over the duration of the predetermined period.

When the abnormality detector 32 determines that the abnormality has continued for an amount equal to or greater than the preset period, i.e., "YES" at S72, the process proceeds to S73. At S73, the fail-safe assurer 33 performs a fail-safe process and then the series of processes, as shown in both FIG. 2 and FIG. 4, ends. When the abnormality detector 32 determines that the abnormality detection has not continued for a predetermined period, i.e., "NO" at S72, the process returns to S71, and the abnormality detector 32 determines again whether an abnormality has been detected. If the abnormality detector 32 does not detect an abnormality, i.e., "NO" at S71, the series of processes ends without executing the fail-safe process (e.g., at S73).

Figure 4:
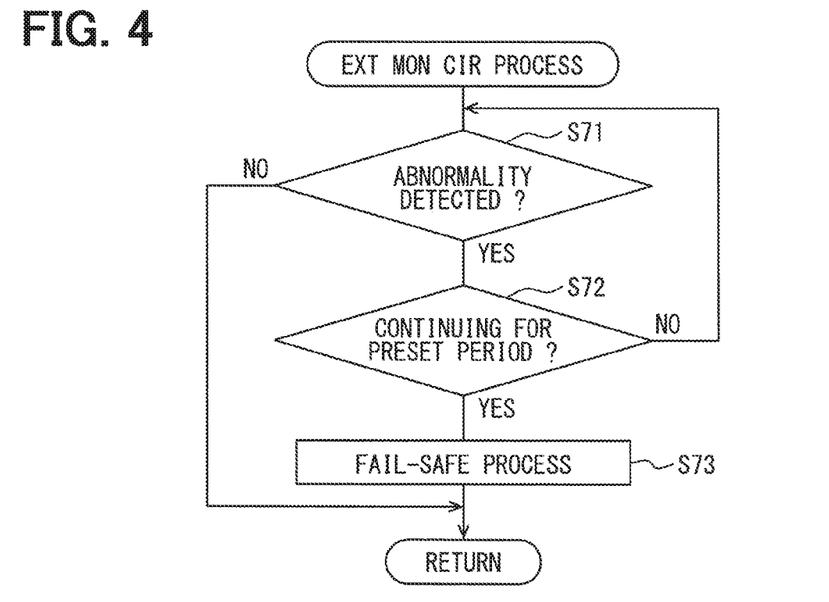
FIG. 4 is a flowchart of a subprocess of the abnormality detection process performed by an external monitoring circuit.

The subprocess at S70 in FIG. 2 and the processes S71, S72, and S73 of subprocess S70 in FIG. 4 are performed by the external monitoring circuit 30.

The following paragraphs describe the advantageous effects that may be achieved by the above-described electronic control unit 10.

According to the electronic control unit 10 shown in the present embodiment, the self-diagnostic section 23 can detect the internal abnormality of the computer 20 and can identify the cause of the detected abnormality. As such, it is possible to detect an abnormality related to the monitoring signal output section 22. When an abnormality related to the monitoring signal output section 22 is detected, the break signal output section 24 generates and outputs a monitor break signal by hardware processing. By using the monitor break signal, the input of the monitoring signal to the external monitoring circuit 30 can be interrupted and/or stopped.

Consequently, even when an abnormality (e.g., software abnormality) occurs in the monitoring signal output section 22 and the monitoring signal output sections continues to output the monitoring signal despite the occurrence of the abnormality, the break signal output section 24 can be used to stop/interrupt the input of the monitoring signal to the external monitoring circuit 30. That is, even when an abnormality of the monitoring signal output section 22 occurs, the external monitoring circuit 30 can detect an abnormality of the computer 20 and a fail-safe process can be performed. For example, the fail-safe assurer 33 outputs a reset signal for resetting the computer 20, in an attempt to recover the computer 20 from the abnormal state.

Particularly in the present embodiment, the electronic control unit 10 is provided with the break switch 50. The break switch 50 can be turned ON by the monitor break signal, and the monitoring signal is fixed to the ground potential to realize a monitoring signal stop/OFF equivalent state. As described above, even when an abnormality related to the monitoring signal output section 22 occurs, the external monitoring circuit 30 can detect the abnormality of the computer 20 with the above-described configuration.

Typically, the software abnormality of the monitoring signal output section 22 may continue to persist. However, in the present embodiment, when an abnormality of the computer 20 is continuously detected for a predetermined period by the abnormality detector 32, the fail-safe assurer 33 performs a fail-safe process. Consequently, such processing and configuration improves the detection accuracy for detecting abnormalities in the computer 20, and limits erroneous performances of the fail-safe process due to the misdetection or erroneous detection of abnormalities (e.g., falsely determining there is an abnormality in the computer 20 when in fact no abnormalities exist).

Second Embodiment

The description of the second embodiment may focus on the differences from the first embodiment. Like elements and features used in the second embodiment and previously described in the first embodiment may use the same reference numbers as those elements and features in the first embodiment, and a repeat description of such elements and features may be omitted from the description of the second embodiment.

Figure 5:
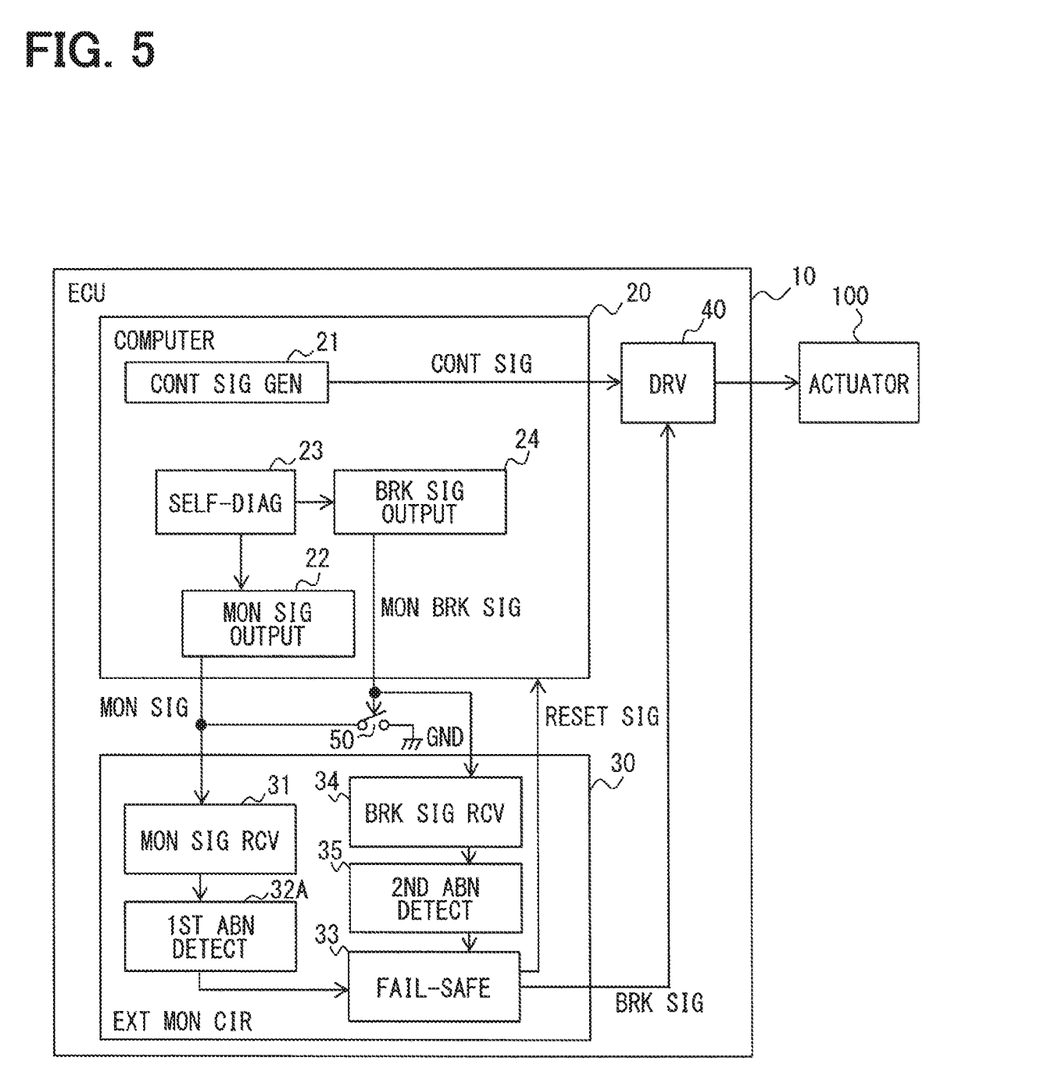
FIG. 5 is a block diagram of an electronic control unit in a second embodiment of the present disclosure.

As shown in FIG. 5, in the electronic control unit 10 of the present embodiment, the monitor break signal from the break signal output 24 is output not only to the break switch 50, but also to the external monitoring circuit 30. The external monitoring circuit 30 includes the monitoring signal receiving section 31, a first abnormality detector 32A, the fail-safe assurer 33, a break signal receiver 34, and a second abnormality detector 35. The function of the first abnormality detector 32A is the same as that of the abnormality detector 32, and may be referred to simply as the abnormality detector 32A. The configuration of the other elements in second embodiment is the same as the configuration of those elements, as described in the preceding embodiment.

The break signal receiver 34 receives the monitor break signal output from the break signal output section 24 of the computer 20. The second abnormality detector 35 detects an abnormality of the computer 20 based on the monitor break signal received by the break signal receiver 34. The second abnormality detector 35 of the present embodiment detects the occurrence of an abnormality in the computer 20 by receiving the monitor break signal via the break signal receiver 34. The fail-safe assurer 33 performs a fail-safe process based on the detection results of the abnormality detector 32A and the second abnormality detector 35. Among the detection results from the abnormality detector 32A and the second abnormality detector 35, the fail-safe assurer 33 gives priority to the detection result of the abnormality detector 35.

Similar to the first embodiment, the ECU 10, that is the computer 20 and the external monitoring circuit 30 may perform the process shown in FIG. 2. The processing at S70 in FIG. 2 and performed by the external monitoring circuit 30 of the present embodiment, that is, as "An external monitoring circuit process" is described with reference to FIG. 6.

Figure 6:
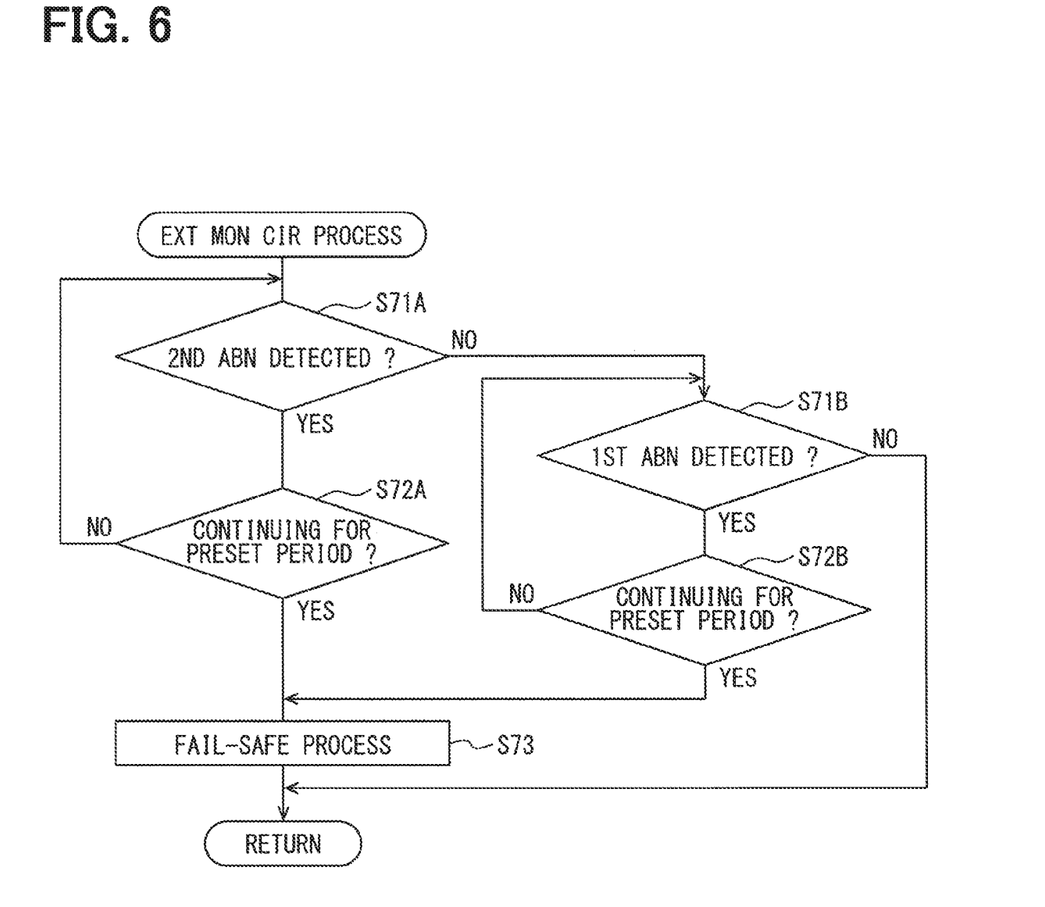
FIG. 6 is a flowchart of a subprocess performed by an external monitoring circuit in an abnormality detection process performed by the electronic control unit in the second embodiment.

As shown in FIG. 6, at S71A, the second abnormality detector 35 of the external monitoring circuit 30 determines whether an abnormality of the computer 20 has been detected, shown as "2ND ABN DETECTED?" in FIG. 6. In the present embodiment, when the second abnormality detector 35 receives the monitor break signal, the second abnormality detector 35 detects (i.e., determines) that there is an abnormality in the computer 20.

When the second abnormality detector 35 detects an abnormality, i.e., "YES" at S71A, the process proceeds to S72A. At S72A, the second abnormality detector 35 determines whether the detection of the abnormality continues for a predetermined period. For example, the second abnormality detector 35 or other element in the external monitoring circuit may include a counter (i.e., timer), and when a value of a counter that measures the number of times of abnormality detection exceeds a preset number, the second abnormality detector 35 may determine that the abnormality is continuing for the predetermined period. Alternatively, the second abnormality detector 35 may determine an abnormality when the detection of the abnormality has continued for the duration of a preset period or longer.

When the second abnormality detector 35 determines that the abnormality continues for a preset period, "YES" at S72A, the process proceeds to S73. At S73, the fail-safe assurer 33 performs a fail-safe process and the series of processes, e.g., as shown in FIGS. 2 and 6, then ends. When the second abnormality detector 35 determines that the abnormality is not continuing for a predetermined period, i.e., "NO" at S72A, the process returns to step S71A and the second abnormality detector 35 determines whether an abnormality has been detected again.

When the second abnormality detector 35 does not detect an abnormality, i.e., "NO" at S71A, the process proceeds to S71B. At S71B, the first abnormality detector 32A determines (i.e., detects) whether there is an abnormality of the computer 20, shown as "1ST ABN DETECTED?" in FIG. 6. The process at S71B is the same as the process at S71 as shown and described in the preceding embodiment. When the abnormality detector 32A detects an abnormality, i.e., "YES" at S71B, the process proceeds to S72B. At S72B, the first abnormality detector 32A determines whether the detection of the abnormality has continued for the duration of a preset period or longer. The process at S72B is the same as the process at S72 as shown and described in the preceding embodiment.

When the abnormality detector 32A determines that the abnormality has continued for the predetermined period, i.e., "YES" at S72B, the process proceeds to S73. At S73, the fail-safe assurer 33 performs the fail-safe process and the series of processes, e.g., as shown in FIGS. 2 and 6, then ends. When the first abnormality detector 32A determines that the abnormality has not continued for the duration of the predetermined period, i.e., "NO" at S72B, the process returns to step S71B and the abnormality detector 32A determines again whether an abnormality is detected. When the abnormality detector 32A does not detect any abnormalities, i.e., "NO" at S71B, the series of processes ends without performing the fail-safe process.

The subprocess at S70 in FIG. 2 and the processes S71A, S71B, S72A, S72B, and S73 of the subprocess S70 shown in FIG. 6 may be performed by the external monitoring circuit 30.

The electronic control unit 10 described may realize the following advantageous effects. According to the present embodiment, in addition to the effects described in the preceding embodiment, the following effects can be further exhibited.

According to the electronic control unit 10 shown in the present embodiment, the second abnormality detector 35 detects an abnormality of the computer 20 based on the monitor break signal. When an abnormality of the computer 20 is detected by the second abnormality detector 35, the fail-safe assurer 33 performs the fail-safe process. In such a way, since the break signal output section 24 for generating the monitor break signal is configured as hardware and is used directly for the detection of abnormalities, abnormalities that occur in the monitoring signal output section 22 are detected more reliably. For example, even when the break switch 50 fails, by also sending the monitor break signal to the external monitoring circuit 30, it is possible to notify the external monitoring circuit 30 of the abnormality in the computer 20.

In the present embodiment, when an abnormality of the computer 20 is detected by the second abnormality detector 35, the fail-safe assurer 33 can perform the fail-safe process regardless of the detection result of the first abnormality detector 32A. In such a way, since the detection result of the second abnormality detector 35 based on the monitor break signal is prioritized, the electronic control unit 10 of the present embodiment limits and/or prevents the misdetection or erroneous detection of an abnormality occurring in the monitoring signal output section 22.

As described above, abnormalities in the monitoring signal output section 22 may typically persist. In the present embodiment, when the second abnormality detector 35 continuously detects an abnormality of the computer 20 for a predetermined period of time, the fail-safe assurer 33 performs a fail-safe process. In such manner, the detection accuracy for detecting the abnormality of the computer 20 can be improved, and erroneous performances of the fail-safe process, e.g., due to false or erroneous abnormality detection, can be limited and/or prevented. The first abnormality detector 32A described in the second embodiment is the same as the abnormality detector 32 shown and described in the first embodiment.

The disclosure of the specification is not limited to the illustrated and described embodiments. The disclosure encompasses not only the embodiments as described and illustrated, but also modifications of those embodiments. For example, the disclosure is not limited to the combination of elements shown in the respective embodiments. The disclosure can be implemented in various combinations and the technical scope of the disclosure is not limited to the description of a single embodiment. For example, the first embodiment may be combined with the second embodiment to realize a new embodiment. Such a combined embodiment may be realized by adding some feature and elements from one embodiment while eliminating some features and elements of another embodiment.

Although the example embodiments describe the actuator 100 as the electronic throttle motor, the present disclosure is not limited to such device. That is, an injector, motor, or other device that may be controlled/actuated in the vehicle may be considered as the actuator 100.

Although the example monitoring signal is described as a watchdog signal, the monitoring signal is not limited to such a signal. For example, for the configuration where the self-diagnostic result of the computer 20 is output to the external monitoring circuit 30 by serial peripheral interface (SPI) communication, the self-diagnostic result may be used as the monitoring signal.

While the examples in the above embodiments describe that the fail-safe process is performed when an abnormality is continuously detected for a preset/predetermined period of time, the present disclosure is not limited to such a scheme. For example, when an abnormality of the computer 20 is detected, the fail-safe process may be performed immediately regardless of whether the abnormality is detected for a preset period of time.

Although the example embodiments describe a fail-safe process that is performed with priority given to the result of the second abnormality detector 35, the present disclosure is not limited to such a scheme.

What is claimed is:

1. An electronic control unit comprising:
a computer configured to output a monitoring signal;
an external monitoring circuit configured to monitor a state of the computer based on the monitoring signal, wherein
the computer includes:
   a monitor-output section configured to generate and output the monitoring signal to the external monitoring circuit by performing a software process;
   a diagnostic section configured to self-diagnose the computer and to detect an abnormality by identifying a cause of the abnormality; and
a break-output section configured to output a break signal to interrupt an input of the monitoring signal to the external monitoring circuit by performing a hardware process when an abnormality in the monitor-output section is detected, wherein
the external monitoring circuit includes:
an abnormality detector configured to detect an abnormality of the computer based on the monitoring signal; and
a fail-safe assurer configured to perform a preset fail-safe process when the abnormality of the computer is detected by the abnormality detector, wherein
the fail-safe assurer is further configured to perform the fail-safe process when the abnormality detector continuously detects the abnormality of the computer for a predetermined period.

2. An electronic control unit comprising:
a computer configured to output a monitoring signal;
an external monitoring circuit configured to monitor a state of the computer based on the monitoring signal, wherein
the computer includes:
   a monitor-output section configured to generate and output the monitoring signal to the external monitoring circuit by performing a software process;
   a diagnostic section configured to self-diagnose the computer and to detect an abnormality by identifying a cause of the abnormality; and
a break-output section configured to output a break signal to interrupt an input of the monitoring signal to the external monitoring circuit by performing a hardware process when an abnormality in the monitor-output section is detected, wherein
the external monitoring circuit includes:
an abnormality detector configured to detect an abnormality of the computer based on the monitoring signal; and
a fail-safe assurer configured to perform a preset fail-safe process when the abnormality of the computer is detected by the abnormality detector,
wherein
the external monitoring circuit further includes a second abnormality detector configured to receive the break signal and to detect the abnormality of the computer based on the break signal, and
the fail-safe assurer is further configured to perform the fail-safe process when the second abnormality detector detects the abnormality of the computer,
wherein
the fail-safe assurer is further configured to perform the fail-safe process regardless of a detection result of the abnormality detector when the second abnormality detector detects the abnormality of the computer.

3. The electronic control unit of claim 2, wherein
the fail-safe assurer is further configured to perform the fail-safe process when the second abnormality detector continuously detects the abnormality of the computer for a predetermined period.

* * * * *